Figure 1:
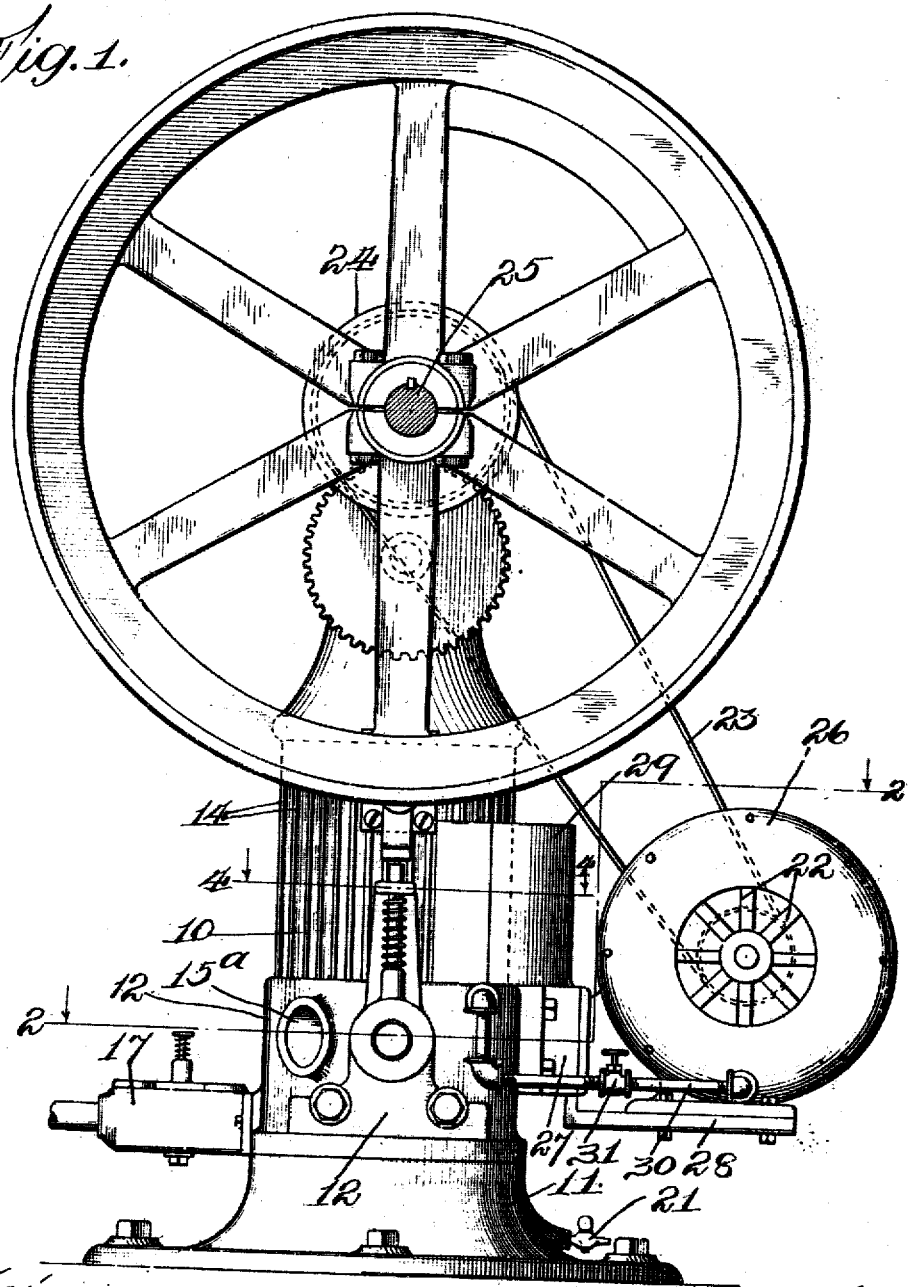

No. 820,549. PATENTED MAY 15, 1906.
E. P. CALDWELL.
MEANS FOR COOLING ENGINE AND OTHER CYLINDERS.
APPLICATION FILED DEC. 22, 1904.

3 SHEETS—SHEET 1.

No. 820,549. PATENTED MAY 15, 1906.
E. P. CALDWELL.
MEANS FOR COOLING ENGINE AND OTHER CYLINDERS.
APPLICATION FILED DEC. 22, 1904.

3 SHEETS—SHEET 2.

Witnesses:
G. V. Domanus
J. B. Weir

Inventor:
Edward P. Caldwell
by Bond, Adams, Pickard & Jackson
his Attys.

No. 820,549. PATENTED MAY 15, 1906.
E. P. CALDWELL.
MEANS FOR COOLING ENGINE AND OTHER CYLINDERS.
APPLICATION FILED DEC. 22, 1904.
3 SHEETS—SHEET 3.
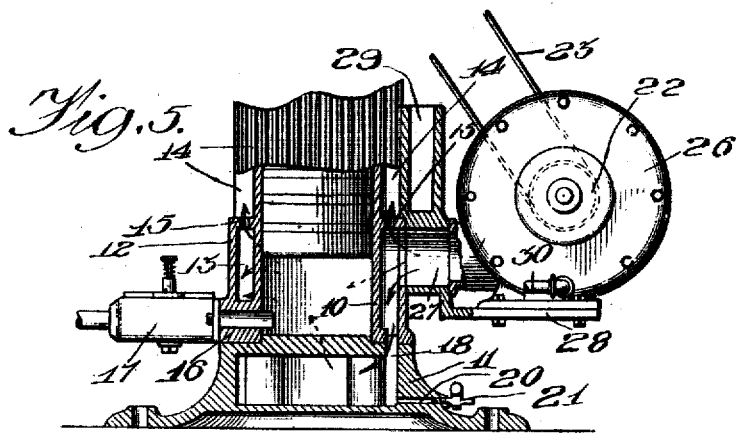
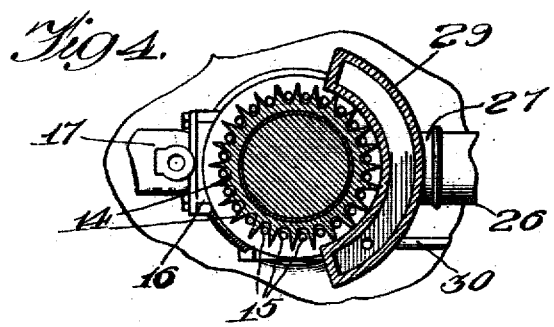

UNITED STATES PATENT OFFICE

EDWARD P. CALDWELL, OF CHICAGO, ILLINOIS, ASSIGNOR TO CHARLES W. CALDWELL, OF WATERLOO, IOWA.

MEANS FOR COOLING ENGINE AND OTHER CYLINDERS.

No. 820,649.

Specification of Letters Patent.

Patented May 15, 1906.

Application filed December 22, 1904. Serial No. 238,020.

*To all whom it may concern:*

Be it known that I, EDWARD P. CALDWELL, a citizen of the United States, residing at Chicago, in the county of Cook and State of Illinois, have invented a certain new and useful Improvement in Means for Cooling Engine and other Cylinders, of which the following is a specification, reference being had to the accompanying drawings.

This invention relates to improved means for readily and effectively cooling the wall of the cylinder in which power is generated, as in the case of gas or gasolene engines, air-compressors, steam-engines, and the like; and, broadly stated, it consists in providing such cylinder with an inclosing jacket and by suitable means rapidly forcing a large volume of air between such cylinder and inclosing jacket.

The invention further contemplates and includes the supplying of a suitable liquid in small quantities to the air-forcing mechanism or to the pipe that conducts the air under pressure to the space between said cylinder and jacket, so that in whichever way such liquid is delivered it will, by the action of the air-blast, be converted into vapor and in that form be forced into the space between the cylinder and jacket.

In the embodiment of my invention in the form shown in the accompanying drawings the entire cylinder is not surrounded with the jacket referred to, but only the lower portion of such cylinder is so surrounded, and my invention contemplates in such case the passing of a portion of the cooling agent from the said space in an upward direction, so as to come in contact with the upper portion of said cylinder, so that the cylinder as a whole may be the more rapidly cooled, and I have provided means for so directing such cooling agent and for providing for an increased amount of surface for it to come in contact with.

I attain the objects above briefly set forth by the devices and combination of devices hereinafter more specifically described; but it is to be understood that many changes in construction may be made from the construction shown without departing from the spirit of my invention.

Those things which I believe to be new will be pointed out in the claims.

Figure 2:
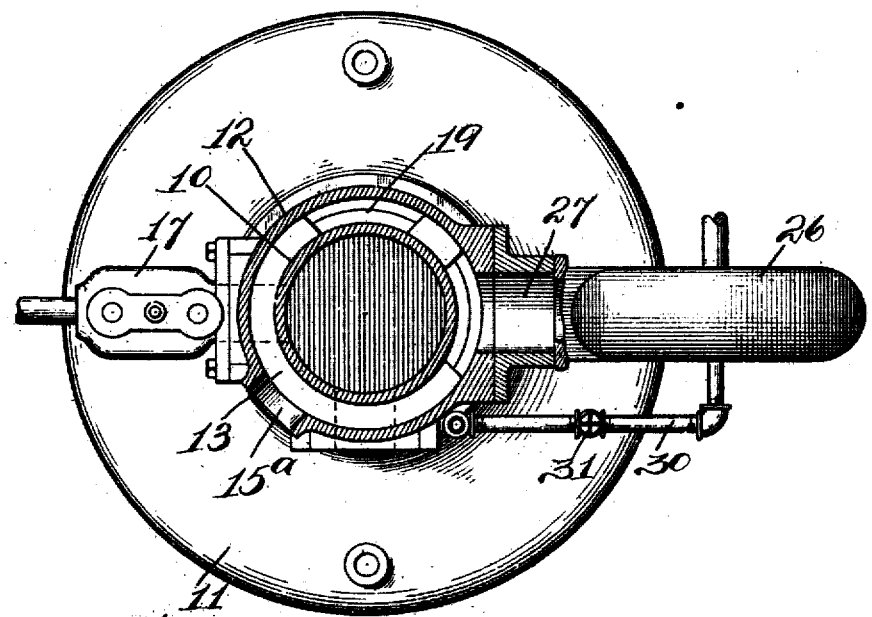
Figure 3:
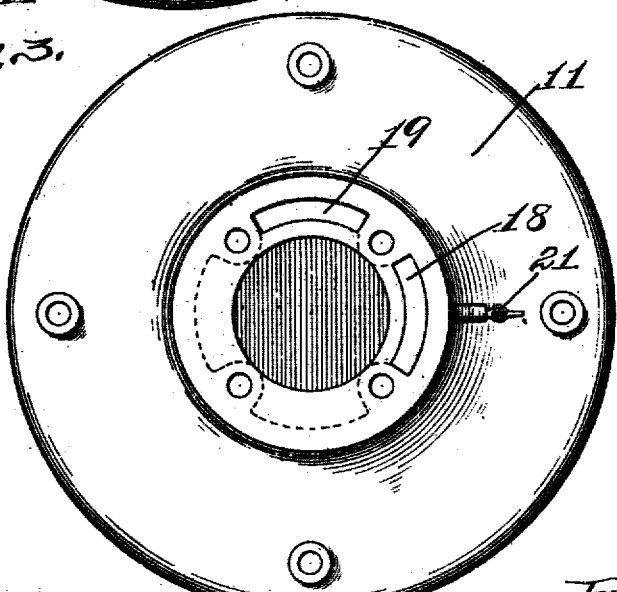

In the accompanying drawings, Figure 1 is a side elevation of a gas-engine to which my improvements are applied. Fig. 2 is a horizontal section at line 2 2 of Fig. 1. Fig. 3 is a plan view of the base. Fig. 4 is a horizontal section at line 4 4 of Fig. 1. Fig. 5 is a view partly in vertical section through the cylinder and jacket, the base, and the water-reservoir and showing the air-blast device in elevation. Fig. 6 is a detail on a smaller scale, being a perspective view of the liquid-reservoir, partly broken away.

Referring to the several figures of the drawings, 10 indicates the cylinder of an engine resting upon a hollow base 11, the central portion of the top of the base fitting tightly within the lower open end of the cylinder in the construction shown.

12 indicates a jacket surrounding the lower portion of the cylinder 10 and located a little distance from such cylinder, so as to leave a considerable space (indicated by 13) between the jacket and cylinder. The portion of the cylinder 10 above the jacket 12 is provided with a large number of radially-projecting fins 14, and in the horizontal wall of the jacket 12 are provided openings 15, one of such openings leading directly to the space between two of the fins, whereby a portion of the cooling agent in the space 13 will be forced directly up against the upper portion of the cylinder 10 and between and against the various fins 14. In the construction shown the cylinder 10 and jacket 12 are shown as formed of a single casting, and at one point the lower portion of the space 13 is cut off by the formation of a solid casting 16, which part 16 is for the purpose of forming a suitable seat to which to attach a valve-chamber 17, carrying an ordinary valve for regulating the admission of fuel to the interior of the cylinder, a suitable pipe from such valve-chamber passing through the solid casting 16, as best shown in Fig. 5. The formation of this solid casting 16, however, will of course only obstruct the space 13 to but a slight extent, thus practically leaving a clear space all around the cylinder from the top of the jacket 12, and in order that the cooling agent may also pass beneath the lower end of the cylinder 10 I have provided an opening 18 through the top wall of the base and another opening 19 for the exit of such cooling agent. By this means the cooling agent can be forced into and through the hollow base 11 and aid in more rapidly cooling said cylinder 10.

20 indicates an opening leading from the lower part of the hollow base 11, through which liquid formed by condensation can pass, such opening being controlled by an ordinary cock 21.

Atmospheric air may be forced into the space around and beneath the cylinder 10 by various means, and in the drawings I have illustrated for this purpose a fan-blower 22, driven by means of a belt 23, that in turn is driven by a pulley 24, fast on the axle 25 of the engine, which fan, however, may of course be driven by any other suitable means. The fan is provided with the usual casing 26. The blast of air created by the fan 22 is driven into the space 13 through a hollow connection 27, as best shown in Fig. 5, the fan being supported on a plate 28, formed with or secured to such hollow connection, and said connection being bolted or otherwise firmly secured to the jacket 12, which jacket is provided with an opening through its side wall communicating with the passage in the connection 27, as clearly shown in Fig. 5.

It has been found highly desirable to force into the space 13 with the air a small amount of liquid material, as thereby the more rapid cooling of the cylinder is facilitated, and if such small amount of liquid is introduced into the device that creates the air-blast, so as to be discharged therefrom with the air, or if such liquid be introduced into the current or blast of air some little distance from the point at which such current or blast enters the space 13, such liquid will at the time it enters said space 13 be converted into a vapor. In Figs. 1, 2, 4, and 5 I have illustrated mechanism for introducing this liquid directly into the air-blast-producing means—to wit, the fan before referred to. Referring to such means, 29 indicates a liquid-reservoir, which in the form of construction shown is formed with the hollow connection 27 and is curved to conform to the curvature of the cylinder 10, such curvature being shown in Fig. 4. 30 indicates a pipe having communication at one end with the lower end of the liquid-reservoir 29 and adapted to discharge liquid therefrom into the casing 26 of the fan, so that it will be forcibly expelled with the air-blast caused by such fan through the hollow connection 27 into the space 13 between the cylinder 10 and jacket 12, such liquid, as before stated, being converted into a vapor by the time it reaches said space 13. Reaching such space the cooling agent—that is, the air and the vapor—is forced around said cylinder and by the means heretofore described into and through the hollow base 11 and up through numerous small openings 15 in the horizontal portion of the jacket 12, passing from thence up and against the fins on the upper portion of the cylinder and between and against the radiating and heated projections 14. The main discharge for the cooling agent is through a passage 15ª, extending through the wall of the surrounding jacket, such discharge-passage being of considerably less diameter than the passage through which the cooling agent enters the space 13, and by reason of such difference in the diameters of these two passages the cooling agent will be forced to fill the space 13, and a portion of it will also be forced into and through the hollow base and another portion up through the small openings 15.

The construction described enables a blast of air to be discharged with great force around, against, and under a heated cylinder and to cool the same rapidly and effectively, and by the introduction of liquid in small quantities with the blast of air and the conversion of such liquid into vapor by the time it reaches the space between the cylinder and the jacket the cooling operation is found to be very much facilitated. As shown, the pipe 30 is provided with a suitable valve 31, by which the quantity of liquid from the reservoir 29 may be regulated as desired.

That which I claim as my invention, and desire to secure by Letters Patent, is—

1. The combination with a cylinder provided on its upper portion with longitudinally-arranged fins, and a jacket surrounding the lower portion of said cylinder, said jacket having an upper end wall portion in which is a series of openings registering with the spaces between said fins, of means for admitting a cooling agent to the space between said cylinder and jacket, substantially as specified.

2. The combination with a cylinder provided on its upper portion with longitudinally-arranged fins, and a jacket surrounding the lower portion of said cylinder, said jacket having an upper end wall portion in which is a series of openings registering with the spaces between said fins, of means for forcing a cooling agent into the space between said cylinder and jacket and out of said openings to direct it between said fins and against the surface of the upper portion of the cylinder, substantially as specified.

3. The combination with a cylinder provided on its upper portion with longitudinally-arranged fins, and a jacket surrounding the lower portion of said cylinder, said jacket having an upper end wall portion in which is a series of openings registering with the spaces between said fins, of means for producing a vapor, and means for forcing said vapor into the space between said cylinder and jacket and out of said openings so that it will be directed between said fins and against the surface of the upper portion of the cylinder, substantially as specified.

4. The combination with a cylinder and a jacket surrounding the lower portion thereof, said jacket having an apertured wall at its upper end through which a cooling agent is adapted to be directed against the upper portion of the cylinder, of a hollow base for said cylinder, the interior of said base communicating with the space between the cylinder and the jacket, and means for forcing a cooling agent through said base and the space between the cylinder and jacket, substantially as specified.

5. The combination with a cylinder and a jacket surrounding the lower portion thereof, said jacket having an apertured wall at its upper end through which a cooling agent is adapted to be directed against the upper portion of the cylinder, of a hollow base for said cylinder, the central portion of the top of the base fitting within the cylinder and the interior of the base communicating with the space between the cylinder and the jacket, and means for forcing a cooling agent through said base and the space between the cylinder and jacket, substantially as specified.

6. The combination with a cylinder and a jacket surrounding the lower portion thereof, said jacket having an apertured wall at its upper end through which a cooling agent is adapted to be directed against the upper portion of the cylinder, of a hollow base for said cylinder, the interior of said base communicating with the space between the cylinder and the jacket, and means for forcing a cooling agent through said base and the space between the cylinder and jacket, said cooling agent having an exit in addition to the openings in the upper wall of the jacket, such additional exit being of less size than the opening through which the cooling agent enters the jacket, substantially as specified.

7. The combination with a cylinder provided on its upper portion with a series of fins, and a jacket surrounding the lower portion of said cylinder, said jacket having an upper end wall portion in which is a series of openings, of a fan-blower, means of driving said fan-blower, a liquid-reservoir, and means for conducting liquid from said reservoir into the path of the air-current created by said fan, substantially as specified.

8. The combination with a cylinder provided on its upper portion with a series of fins, a jacket surrounding the lower portion of said cylinder, said jacket having upwardly-directed discharge-openings, and a hollow base, the interior of which communicates with the space between said cylinder and jacket, of a fan-blower, means for driving said fan-blower, a liquid-reservoir, and means for conducting liquid from said reservoir into the path of the air-current created by said fan, substantially as specified.

EDWARD P. CALDWELL.

Witnesses:
ALBERT H. ADAMS,
MINNIE A. HUNTER.